N. NELSON.
HAND CAR.
APPLICATION FILED MAY 12, 1913.

1,074,523.

Patented Sept. 30, 1913.

WITNESSES:
D. E. Carlsen.
A. E. Carlsen.

INVENTOR:
Nels Nelson.
BY HIS ATTORNEY:
A. M. Carlsen.

COLUMBIA PLANOGRAPH CO., WASHINGTON, D. C.

UNITED STATES PATENT OFFICE.

NELS NELSON, OF ST. PAUL, MINNESOTA.

HAND-CAR.

1,074,523.

Specification of Letters Patent. Patented Sept. 30, 1913.

Application filed May 12, 1913. Serial No. 766,969.

*To all whom it may concern:*

Be it known that I, NELS NELSON, a subject of the King of Sweden, who have declared my intention to become a citizen of the United States, residing at St. Paul, in the county of Ramsey and State of Minnesota, have invented a new and useful Hand-Car, of which the following is a specification.

My invention relates to improvements in hand cars of the class employed by railway repairers and is by them often termed a section car.

The object of the invention is to provide an improved hand-operated propelling mechanism for said kind of cars.

Figure 1:
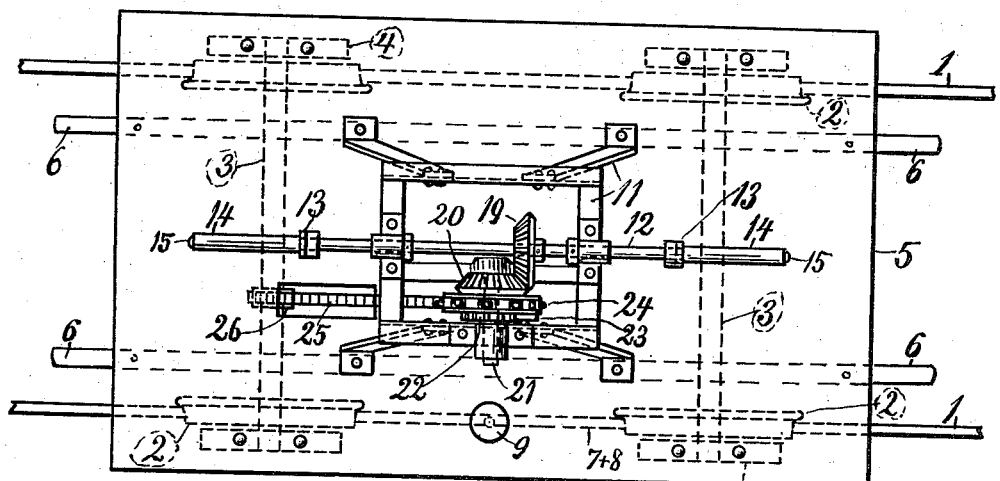
Figures 2, 3, 4:
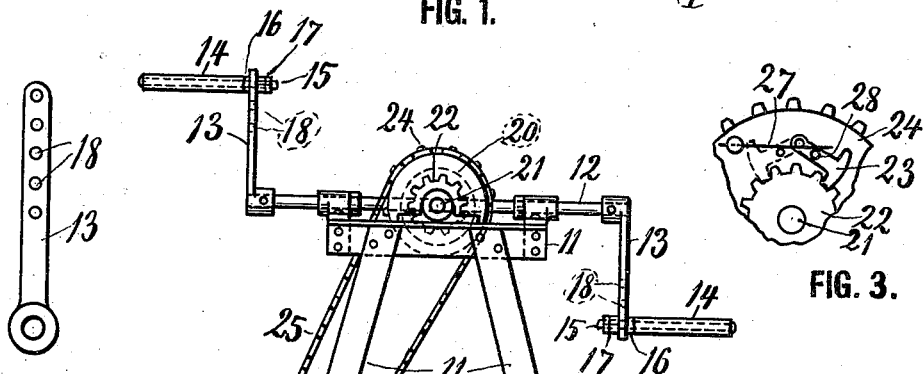

In the accompanying drawing,—Figure 1 is a top view of a hand car embodying my invention. Fig. 2 is a side elevation of the car shown in Fig. 1, with the ratchet pawl omitted. Fig. 3 is an enlarged fragment of the upper part of Fig. 2, showing clearly how a ratchet pawl is arranged for reversing the movement of the car. Fig. 4 is an enlarged detail view of one of the cranks with its handle and handle bar omitted.

Referring to the drawing by reference numerals, 1 designates a railway track upon which such cars are usually employed, 2 are the track wheels, 3 the axles, 4 the journal bearings fixed to a platform 5, which constitutes the main body of the car and is provided with the usual handles 6, by which the car may be picked up and removed from the track. Suspended by links or hangers 7 are brake shoes 8, arranged to brake the track wheels 2 when the operator of the car steps on a push-button 9, which is normally held in raised position by a spring 10, whereby the brakes are also held in idle position.

Secured upon the platform 5 is a frame 11, in which is journaled a shaft 12, provided at each end with a hand crank 13, whose handle 14 is revoluble on a bar 15. Said bar, having a fixed collar 16 and nuts 17 at opposite sides of the crank, is removable to and securable in any of the holes 18 in the crank, so that the stroke or length of the crank may be varied according to the load on the car, and the power available and the speed desired. The shaft 12 occupies a horizontal longitudinal central position on the car, and near its middle is fixed a bevel gear 19, which meshes with a smaller bevel gear 20. The latter gear is fixed on a short shaft 21, which is journaled in the frame and has affixed to it a cog-wheel 22 adapted to act as a ratchet wheel in either direction when engaging a pawl 23. Said pawl is mounted upon the outer or adjacent side of a sprocket wheel 24, which is revoluble on the shaft 21 and engages a link-belt 25, by which is rotated a smaller sprocket 26 fixed on one of the axles 3, and thus the turning of the crank shaft 12 rotates the track wheels and propels the car along. The car is stopped by using the brake, and its motion is reversed by reversing the pawl 23. It will be noted that a spring 27 acts on a pin 28 fixed in the pawl so that the pawl will engage the wheel 22 and cause the latter to rotate the sprocket in either direction according as the crank shaft may be turned. In going down a grade, or allowing the car to run some by the momentum given to it, the cranks may be held still and the pawl permitted to play over the teeth of the wheel 22. By making the crank handles sufficiently long a great number of persons may ride on the car and propel it, and such propulsion is more even and efficient than the intermittent jerks of any of the pumping mechanisms heretofore employed for propelling hand cars on railway tracks.

What I claim is:—

1. In a car of the class described, the combination with a platform, of axles and wheels fixed together and supporting the same, a sprocket fixed on one of the axles, a frame mounted on the platform, a short shaft journaled in the frame and having at one end fixed a bevel gear, a longer shaft journaled in longitudinal direction of the car, a bevel gear fixed on the long shaft and meshing with the bevel gear on the short shaft, hand cranks at the ends of the long shaft, a sprocket revolubly mounted on the short shaft and a reversible ratchet mechanism constituting operative connection between the short shaft and the sprocket wheel on same and an endless link-belt connecting the sprocket on the short shaft with the sprocket on the axle.

2. In a car of the class described, the combination with a platform, of axles and wheels supporting the same, a sprocket fixed on one of the axles, a frame mounted on the platform, a short shaft journaled in the frame and having at one end a fixed bevel gear, a longer shaft journaled in longitudinal direction of the car, a bevel gear fixed on the long shaft and meshing with the bevel gear on the short shaft, hand cranks at the ends of the long shaft, a sprocket revolubly mounted on the short shaft and a reversible ratchet mechanism constituting operative connection between the short shaft and the sprocket wheel on same, said ratchet mechanism consisting of a cog wheel fixed on the shaft, a pawl pivoted to the adjacent side of the sprocket, and a spring pressing on the pawl to hold it engaged with the cog wheel, said pawl being reversible so as to enable the operating mechanism to be reversed for moving the car in either direction on the track and an endless link-belt connecting the sprocket on the short shaft with the sprocket on the axle.

In testimony whereof I affix my signature, in presence of two witnesses.

NELS NELSON.

Witnesses:
C. A. OBERG,
H. SANDBERG.

---

Copies of this patent may be obtained for five cents each, by addressing the "Commissioner of Patents, Washington, D. C."